US012812216B2

(12) United States Patent
Hsu et al.

(10) Patent No.: US 12,812,216 B2
(45) Date of Patent: Nov. 24, 2026

(54) SERVER, METHOD AND COMPUTER PROGRAM

(71) Applicant: 17LIVE Japan INC., Tokyo (JP)

(72) Inventors: Yung-Chi Hsu, Taipei City (TW); Yu-Wen Huang, Taipei City (TW); Yu-Chuan Chang, Taipei City (TW)

(73) Assignee: 17LIVE Japan INC., Tokyo (JP)

( * ) Notice: Subject to any disclaimer, the term of this patent is extended or adjusted under 35 U.S.C. 154(b) by 0 days.

(21) Appl. No.: 19/023,092

(22) Filed: Jan. 15, 2025

(65) Prior Publication Data

US 2025/0254396 A1 Aug. 7, 2025

(30) Foreign Application Priority Data

Feb. 7, 2024 (JP) ................................ 2024-017516

(51) Int. Cl.

| | |
|---|---|
| ***H04N 21/4784*** | (2011.01) |
| ***H04N 21/2187*** | (2011.01) |
| ***H04N 21/239*** | (2011.01) |

(52) U.S. Cl.

CPC ..... *H04N 21/4784* (2013.01); *H04N 21/2187* (2013.01); *H04N 21/2393* (2013.01)

(58) Field of Classification Search

CPC .......... H04N 21/4784; H04N 21/2187; H04N 21/2393

USPC ........................................................ 725/116

See application file for complete search history.

(56) References Cited

U.S. PATENT DOCUMENTS

2008/0162649 A1* 7/2008 Lee ...................... G06Q 10/107 709/206
2011/0106662 A1* 5/2011 Stinchcomb ........... H04N 7/141 715/757
2019/0080375 A1* 3/2019 Alvarez ............ G06Q 30/0601

FOREIGN PATENT DOCUMENTS

| | | | | |
|---|---|---|---|---|
| CN | 106897890 A | | 6/2017 | |
| CN | 111327953 A | | 6/2020 | |
| CN | 106846040 B | * | 11/2021 | ......... G06Q 30/0208 |
| CN | 113923469 A | | 1/2022 | |
| CN | 114025189 A | | 2/2022 | |
| CN | 111625569 B | * | 4/2023 | .......... G06F 16/248 |
| JP | 2021052374 A | | 4/2021 | |
| JP | 2022097114 A | | 6/2022 | |
| JP | 2022119770 A | | 8/2022 | |
| JP | 2023032293 A | | 3/2023 | |

(Continued)

OTHER PUBLICATIONS

Office Action dated Oct. 1, 2024 of the corresponding Japan patent application No. 2024-017516.

(Continued)

*Primary Examiner* — Adil Ocak

(74) *Attorney, Agent, or Firm* — HOLS IPR SERVICES; Chun-Ming Shih

(57) ABSTRACT

A server comprising a circuitry, wherein the circuitry is configured to perform: receiving a first request on generating a gift item from a first user terminal of a first user; generating the gift item according to the first request; and evaluating value of the gift item according to information of the first request. According to the present disclosure, the livestreamer may generate or invite viewers to generate a customized gift. The customized gift may help the livestreamer on the interaction with viewers and also in the event or the like. Therefore, the user experience and interaction between the livestreamer and viewers may be improved.

9 Claims, 10 Drawing Sheets

(56) References Cited

FOREIGN PATENT DOCUMENTS

| | | | |
|---|---|---|---|
| JP | 2023125044 | A | 9/2023 |
| JP | 7385204 | B1 | 11/2023 |
| JP | 7428334 | B1 | 2/2024 |
| KR | 20210025422 | A | 3/2021 |

OTHER PUBLICATIONS

Notice of Allowance dated Dec. 3, 2024 of the corresponding Japan patent application No. 2024-017516.

* cited by examiner

320

| Stream ID | livestreamer ID | Viewer ID |
|---|---|---|
| ST22 | 001A | SS5, SS12, SS43 |
| ST92 | 002B | TT3, TS2 |
| ... | ... | ... |

FIG. 4

322

| User ID | Point | Level | Status |
|---|---|---|---|
| 001A | 3243 | 10 | normal |
| SS5K | 1803 | 35 | VIP |
| 003C | 9201 | 90 | SVIP |
| ... | ... | ... | ... |

FIG. 5

324

| Item ID | Point | Event ID | Effect |
|---|---|---|---|
| TT01 | 100 | EV99 | http://TT01.cc |
| TE01 | 1,000 | - | http://TE01.cc |
| VD01 | 5,000 | EV34 | http://VD01.cc |
| ... | ... | | |

FIG. 6

326

| Item ID | Point | Value | Event ID | Creator ID | invitee ID | status | Effect |
|---|---|---|---|---|---|---|---|
| CI001 | 100 | 50 | EV99 | 001A | - | on | http://TT01.cc |
| CI002 | 1,000 | 1,000 | - | AK58 | - | on | http://TE01.cc |
| CI003 | 5,000 | 6,000 | EV34 | 003C | 002B | off | http://VD01.cc |
| ... | ... | ... | ... | ... | ... | ... | ... |

FIG. 7

328

| Event ID | Event Gift ID | Starting time | End time | … |
|---|---|---|---|---|
| EV34 | VE01, VD01… | 2021/1/1 0:00 | 2021/3/31 11:59 | … |
| EV99 | TT01, DT29… | 2021/2/5 12:00 | 2021/2/10 12:00 | … |
| … | … | … | … | … |

FIG. 8

SERVER, METHOD AND COMPUTER PROGRAM

CROSS-REFERENCE TO RELATED APPLICATIONS

This application is based on and claims the benefit of priority from Japanese Patent Application Serial No. 2024-017516 (filed on Feb. 7, 2024), the contents of which are hereby incorporated by reference in their entirety.

BACKGROUND OF THE DISCLOSURE

Technical Field

This disclosure relates to information and communication technology, and in particular, to a server, method and computer program in a live streaming.

Description of the Related Art

Some APPs or platforms provide live streaming service for livestreamers and viewers to interact with each other. The livestreamers may have a performance to cheer up the viewer and the viewer may send gifts to support the livestreamers.

The APPs or platform providers always hold events to motivate the interaction between livestreamers and viewers. The livestreamers may select an event and start broadcasting. In order to win the events and receive reward, the livestreamers may do their best to cheer up the viewer. Patent Document 1 disclose a scenario that the livestreamer is participating in an event.

However, if the viewers do not support the livestreamers, their performances become useless and the interaction between livestreamers and viewers would be low. This may lead to poor user experience. Therefore, how to improve the user experience is very important.

[Patent Document 1]: JP2021-052374A

SUMMARY

An embodiment of subject application relates to a server comprising a circuitry, wherein the circuitry is configured to perform: receiving a first request on generating a gift item from a first user terminal of a first user; generating the gift item according to the first request; and evaluating value of the gift item according to information of the first request.

Another embodiment of subject application relates to a method, comprising: receiving a first request on generating a gift item from a first user terminal of a first user; generating the gift item according to the first request; and evaluating value of the gift item according to information of the first request.

Another embodiment of subject application relates to a non-transitory computer-readable medium including program instructions, that when executed by one or more processors, cause the one or more processors to execute: receiving a first request on generating a gift item from a first user terminal of a first user; generating the gift item according to the first request; and evaluating value of the gift item according to information of the first request.

According to the present disclosure, the livestreamer may generate or invite viewers to generate a customized gift. The customized gift may help the livestreamer on the interaction with viewers and also in the event or the like. Therefore, the user experience and interaction between the livestreamer and viewers may be improved.

BRIEF DESCRIPTION OF THE DRAWINGS

FIG. 4 shows an exemplary data structure of the stream DB 320 of FIG. 3;

FIG. 5 shows an exemplary data structure of the user DB 322 of FIG. 3;

FIG. 6 shows an exemplary data structure of the gift DB 324 of FIG. 3;

FIG. 7 shows an exemplary data structure of the customized gift DB 326 of FIG. 3;

FIG. 8 shows an exemplary data structure of the event DB 328 of FIG. 3;

DETAILED DESCRIPTION

Hereinafter, the identical or similar components, members, procedures or signals shown in each drawing are referred to with like numerals in all the drawings, and thereby an overlapping description is appropriately omitted. Additionally, a portion of a member which is not important in the explanation of each drawing is omitted.

The live streaming system 1 according to some embodiments of subject application provides enhancement among the users to communicate and interact smoothly. More specifically, it entertains the viewers and livestreamers in a technical way.

Figure 1:
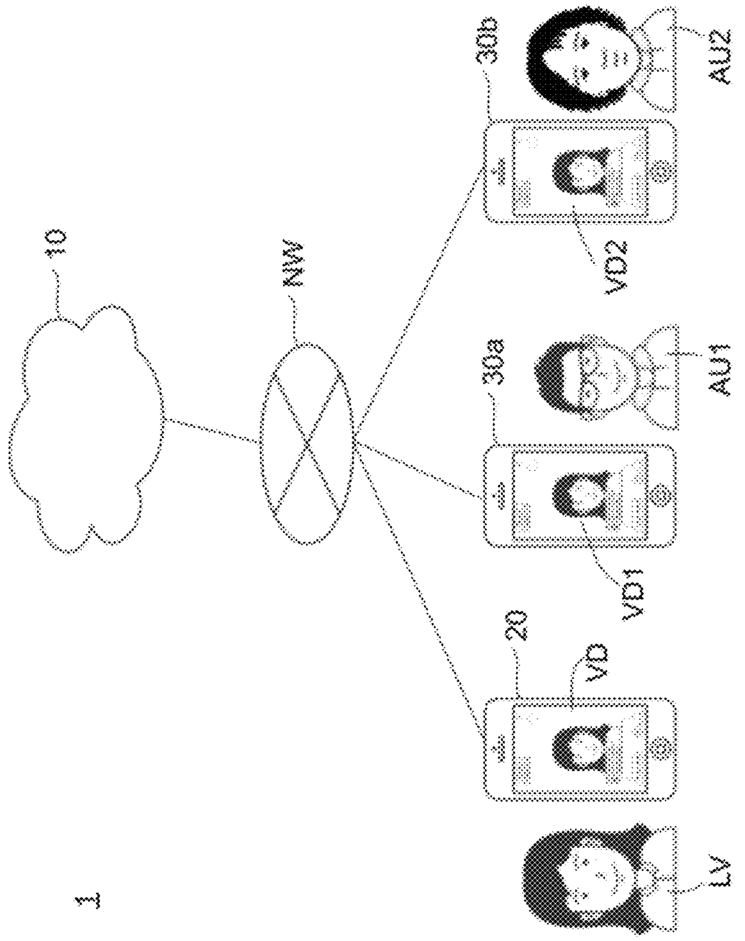
FIG. 1 is a schematic configuration of a live streaming system 1 according to some embodiments of subject application.

FIG. 1 shows a schematic configuration of a live streaming system 1 according to some embodiments of subject application. The live streaming system 1 provides a live streaming service for the streaming livestreamer (may also be referred as liver, streamer or distributor) LV and viewer (may also be referred as audience) AU (AU1, AU2 . . . ) to interact mutually in real time. As shown in FIG. 1, the live streaming system 1 may include a server 10, a user terminal 20 and a user terminal 30 (30*a*, 30*b* . . . ). The user terminal 20 may be a livestreamer and the user terminal 30 may be a viewer. In some embodiments, the livestreamers and viewers may be referred to as the user. The server 10 may include one or a plurality of information processing devices connected via network NW. The user terminal 20 and 30 may be, for example, a portable terminal such as the smartphone, tablet, laptop PC, recorder, mobile game console, wearable device or the like, or the stationary computer such as desktop PC. The server 10, user terminal 20 and user terminal 30 may be communicably connected by any type of wire or wireless network NW.

The live streaming system 1 is involved in the livestreamer LV, the viewer AU, and APP provider (not shown), who provides the server 10. The livestreamer LV may record his/her own contents such as songs, talks, performance, game streaming or the like by his/her own user terminal 20 and upload to the server 10 and be the one who distributes contents in real time. In some embodiments, the livestreamer LV may interact with the viewer AU via the live streaming.

The APP provider may provide a platform for the contents to go on live streaming in the server 10. In some embodiments, the APP provider may be the media or manager to manage the real time communication between the livestreamer LV and viewer AU. The viewer AU may access the platform by the user terminal 30 to select and watch the contents he/she would like to watch. The viewer AU may perform operations to interact with the livestreamer, such as commenting or cheering the livestreamer, by the user terminal 30. The livestreamer, who provides the contents, may respond to the comment or cheer. The response of the livestreamer may be transmitted to the viewer AU by video and/or audio or the like. Therefore, a mutual communication among the livestreamer and viewer may be accomplished.

The "live streaming" in this specification may be referred to as the data transmission which enables the contents the livestreamer LV recorded by the user terminal 20 to be substantially reproduced and watched by the viewer AU via the user terminal 30, In some embodiments, the "live streaming" may also refer to the streaming which is accomplished by the above data transmission. The live streaming may be accomplished by the well-known live streaming technology such as HTTP Live Streaming, Common Media Application Format, Web Real-Time Communications, Real-Time Messaging Protocol, MPEG DASH or the like. The live streaming may further include the embodiment that the viewer AU may reproduce or watch the contents with specific delay while the livestreamer is recording the contents. Regarding the magnitude of the delay, it should be at least small enough to enable the livestreamer LV and the viewer AU to communicate. However, live streaming is different from so-called on-demand streaming. More specifically, the on-demand streaming may be referred to as storing all data, which records the contents, in the server and then providing the data from the server to the user at random timing according to the user's request.

The "streaming data" in this specification may be referred to as the data includes image data or voice data. More specifically, the image data (may be referred to as video data) may be generated by the image pickup feature of the user terminals 20 and 30. The voice data (may be referred to as audio data) may be generated by the audio input feature of the user terminals 20 and 30. The streaming data may be reproduced by the user terminals 20, 30, so that the contents relating to users may be available for watching. In some embodiments, during the period from the streaming data being generated by the user terminal 20 of the livestreamer to being reproduced by the user terminal 30 of the viewer, the processing of changing format, size or specification of the data, such as compression, extension, encoding, decoding, transcoding or the like, is predictable. Before and after this kind of processing, the contents (such as video and audio) are substantially unchanged, so it is described in the current embodiments of the present disclosure that the streaming data before being processed is the same as that after being processed. In other words, if the streaming data is generated by the user terminal 20 of the livestreamer and reproduced by the user terminal 30 of the viewer via the server 10, the streaming data generated by the user terminal 20 of the livestreamer, the streaming data passed through the server 10 and the streaming data received and reproduced by the by the user terminal 30 of the viewer are all the same streaming data.

As shown in FIG. 1, the livestreamer LV is providing the live streaming. The user terminal 20 of the livestreamer generates the streaming data by recording his/her video and/or audio, and transmits to the server 10 via the network NW. At the same time, the user terminal 20 may display the video VD on the display of the user terminal 20 to check the streaming contents of the livestreamer LV.

The viewer AU1, AU2 of the user terminals 30*a*, 30*b*, who request the platform to provide the live streaming of the livestreamer, may receive streaming data corresponding to the live streaming via the network NW and reproduce the received streaming data to display the video VD1, VD2 on the display and output the audio from a speaker or the like. The video VD1, VD2 displayed on the user terminals 30*a*, 30*b* respectively may be substantially the same as the video VD recorded by the user terminal 20 of the livestreamer LV, and the audio outputted from the terminal 30*a*, 30*b* may also be substantially the same as the audio recorded by the user terminal 20 of the livestreamer LV.

The recording at the user terminal 20 of the livestreamer may be simultaneous with the reproducing of the streaming data at the user terminals 30*a*, 30*b* of the viewer AU1, AU2. If a viewer AU1 inputs a comment on the contents of the livestreamer LV into the user terminal 30*a*, the server 10 will display the comment on the user terminal 20 of the livestreamer in real time, and also display on the user terminals 30*a*, 30*b* of the viewer AU1, AU2 respectively. If the livestreamer LV responds to the comment, the response may be outputted as the text, image, video or audio from the terminal 30*a*, 30*b* of the viewer AU1, AU2, so that the communication of the livestreamer LV and viewer LV may be realized. Therefore, the live streaming system may realize the live streaming of two-way communication.

Figure 2:
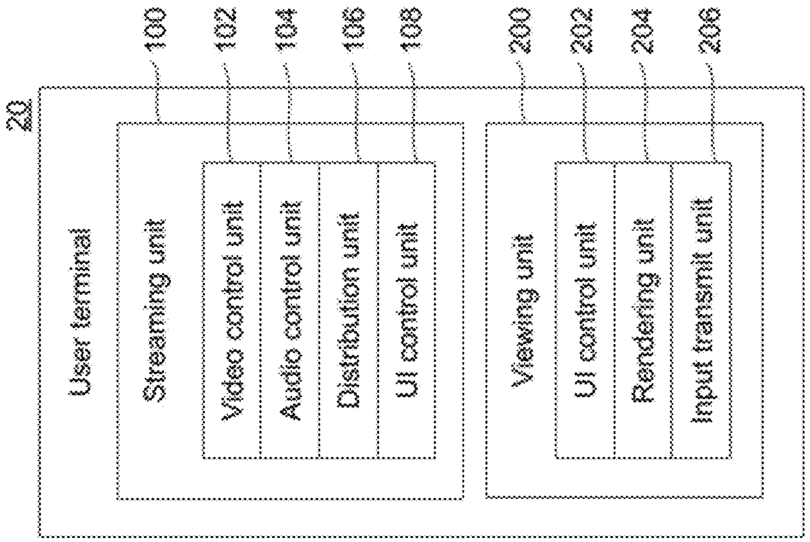
FIG. 2 is a schematic block diagram of the user terminal 20 according to some embodiments of subject application.

FIG. 2 is a block diagram showing a function and configuration of the user terminal 20 in FIG. 1 according to the embodiment of the present disclosure. The user terminal 30 has the similar function and configuration of the user terminal 20. The blocks depicted in the block diagram of this specification are implemented in hardware such as devices like a CPU of a computer or mechanical components, and in software such as a computer program depicts functional blocks implemented by the cooperation of these elements. Therefore, it will be understood by those skilled in the art that the functional blocks may be implemented in a variety of manners by a combination of hardware and software.

The livestreamer LV and viewer AU may download and install the live streaming application (live streaming APP) of the present disclosure to the user terminal 20 and 30 from the download site via network NW. Or the live streaming APP may be pre-installed in the user terminals 20 and 30. By the execution of the live streaming by the user terminals 20 and 30, the user terminals 20 and 30 may communicate with the server 10 via the network NW to realize a plurality of functions. The functions realized by the execution of the live streaming APP by the user terminals 20 and 30 (More specifically, the processor such as CPU) is described below as the functions of the user terminals 20 and 30. These functions are basically the functions that the live streaming APP makes the user terminals 20 and 30 realize. In some embodiments, these functions may also be realized by transmitting from the server 10 to the web browser of the user terminals 20 and 30 via network NW and be executed by the computer program of the web browser. The computer program may be written in the programming language such as HTML (Hyper Text Markup Language) or the like.

The user terminal 20 includes streaming unit 100 and viewing unit 200. In some embodiments, the streaming unit 100 is configured to record the audio and/or video data of the user and generate streaming data to transmit to the server 10. The viewing unit 200 is configured to receive and reproduce streaming data from server 10. In some embodiments, a user may activate the streaming unit 100 when broadcasting or activate the viewing unit 200 when watching streaming respectively. In some embodiments, the user terminal who is activating the streaming unit 100 may be referred to as a livestreamer or be referred to as the user terminal which generates the streaming data. The user terminal who is activating the viewing unit 200 may be referred to as a viewer or be referred to as the user terminal which reproduces the streaming data.

The streaming unit 100 may include video control unit 102, audio control unit 104, distribution unit 106 and UI control unit 108. The video control unit 102 may be connected to a camera (not shown) and the video is controlled by the camera. The video control unit 102 may obtain the video data from the camera. The audio control unit 104 may be connected to a microphone (not shown) and the audio is controlled by the microphone. The audio control unit 104 may obtain the audio data from the microphone.

The distribution unit 106 receives streaming data, which includes video data from the video control unit 102 and audio data from the audio control unit 104, and transmits to the server 10 via network NW. In some embodiments, the distribution unit 106 transmits the streaming data in real-time. In other words, the generation of the streaming data from the video control unit 102 and audio control unit 104, and the distribution of the distribution unit 106 is performed simultaneously.

UI control unit 108 controls the UI for the livestreamer. The UI control unit 108 is connected to a display (not shown) and is configured to generate the streaming data to whom the distribution unit 106 transmits, reproduces and displays the streaming data on the display. The UI control unit 108 shows the object for operating or the object for instruction-receiving on the display and is configured to receive the tap input from the livestreamer.

The viewing unit 200 may include UI control unit 202, rendering unit 204 and input transmit unit 206. The viewing unit 200 is configured to receive streaming data from server 10 via network NW. The UI control unit 202 controls the UI for the viewer. The UI control unit 202 is connected to a display (not shown) and/or speaker (not shown) and is configured to display the video on the display and output the audio from the speaker by reproducing the streaming data. In some embodiments, Outputting the video on the display and audio from the speaker may be referred to as "reproducing the streaming data". The UI control unit 202 may be connected to an input unit such as touch panel, keyboard or display or the like to obtain input from the users.

The rendering unit 204 may be configured to render the streaming data from the server 10 and the frame image. The frame image may include user interface objects for receiving input from the user, the comments inputted by the viewers and the data received from the server 10. The input transmit unit 206 is configured to receive the user input from the UI control unit 202 and transmit to the server 10 via the network NW.

In some embodiments, the user input may be clicking an object on the screen of the user terminal such as selecting a live stream, entering a comment, sending a gift, following or unfollowing an user, voting in an event, gaming or the like. For example, the input transmit unit 206 may generate gift information and transmit to server 10 via the internet NW if the user terminal 30 of the viewer clicks a gift object on the screen in order to send a gift to the livestreamer.

In some embodiments, the user terminal 20 may include a terminal side gift DB (not shown). The terminal side gift DB is configured to store the gift information of the user terminal 20 or 30. The terminal side gift DB may include gift ID, icon ID, effect data ID and final update date. The gift ID may identify the gift. The Icon ID may be the icon data of the gift object. The effect data ID may identify the data realizing the effect corresponding to the gift. The final update date may identify the final update date of the gift.

In some embodiments, the viewer may download the gift in advance or download the gift when sending gifts. In some embodiments, gift information may be downloaded and stored in the terminal side gift DB in advance. In some embodiments, the terminal side gift DB may include the gift list corresponding to the gift list provided by the server 10. In some embodiments, the gift list in the terminal side gift DB may be synchronized with the server 10 periodically or by an operation from the user.

Figure 3:
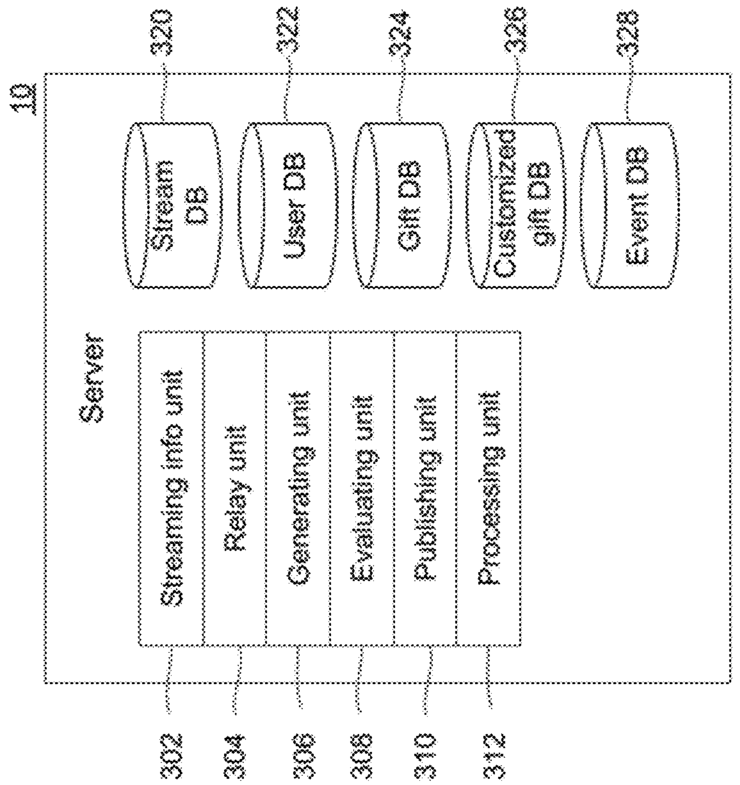
FIG. 3 is a schematic block diagram of the server 10 according to some embodiments of subject application.

FIG. 3 is a schematic block diagram of the server 10 according to some embodiments of the subject application. The server 10 may include streaming info unit 302, relay unit 304, generating unit 306, evaluating unit 308, publishing unit 310, processing unit 312, stream DB 320, user DB 322, gift DB 324, customized gift DB 326 and event DB 328.

The streaming info unit 302 receives the request of live streaming from the user terminal 20 of the livestreamer via the network NW. Once receiving the request, the streaming info unit 302 registers the information of the live streaming on the stream DB 320. In some embodiments, the information of the live streaming may be the stream ID of the live streaming and/or the livestreamer ID of the livestreamer corresponding to the live streaming.

Once receiving the request of providing the information of the live streaming from the viewing unit 200 of the user terminal 30 from the viewer via the network NW, the streaming info unit 302 refers to the stream DB 320 and generates a list of the available live streaming.

The streaming info unit 302 then transmits the list to the user terminal 30 via the network NW. The UI control unit 202 of the user terminal 30 generates a live streaming selection screen according to the list and displays the list on the display of the user terminal 30.

Once the input transmit unit 206 of the user terminal 30 receives the selection of the live streaming from the viewer on the live streaming selection screen, it generates the streaming request including the stream ID of the selected live streaming and transmits to the server 10 via the network. The streaming info unit 302 may start to provide the live streaming, which is specified by the stream ID in the streaming request, to the user terminal 30. The streaming info unit 302 may update the stream DB 320 to add the viewer's viewer ID of the user terminal 30 to the livestreamer ID of the stream ID.

The relay unit 304 may relay the transmission of the live streaming from the user terminal 20 of the livestreamer to the user terminal 30 of the viewer in the live streaming started by the streaming info unit 302. The relay unit 304 may receive the signal, which indicates the user input from the viewer, from the input transmit unit 206 while the streaming data is reproducing. The signal indicating the user input may be the object-designated signal which indicates the designation of the object shown on the display of the user terminal 30. The object-designated signal may include the viewer ID of the viewer, the livestreamer ID of the livestreamer, who delivers the live streaming the viewer is viewing, and object ID specified by the object. If the object is a gift or the like, the object ID may be the gift ID or the like. Similarly, the relay unit 304 may receive the signal indicating the user input of the livestreamer, for example the object-designated signal, from the streaming unit 100 of the user terminal 20 while the streaming data is reproducing.

The generating unit 306 may be configured to generate gifts according to input from the users. In some embodiments, the gift may be an event gift for an event the livestreamer is participating in. In some embodiments, the gift may be a normal gift, time-limited gift, game gift or the like. In some embodiments, the viewer may generate the gift in response to an invitation from the livestreamer. In some embodiments, the viewer or the livestreamer may generate the gift voluntarily by themselves. The gift may be generated via text data, audio data, video data or the like. For example, the viewer may type a description or input a speech of sentences to generate the gift.

In some embodiments, the viewer may determine the information of the gift. More specifically, the viewer may determine the icon, the value, the classification, the period or the like of the gift. For example, the viewer may enter a sentence of "generating a luxury event gift" to generate an event gift over 1 million points or the like. In some embodiments, the information of the gift may be determined according to the input from the viewer. For example, the viewer may say "I would like an event gift with an icon of a dragon and with a normal value", so an event gift based on the input may be generated.

In some embodiments, the generation of the gift may be an internal service or third-party service. In some embodiments, the generation of the event gift may be generated via machine learning model or the like. For example, the gift may be generated via generative AI, ChatGPT, Midjourney or the like.

The evaluating unit 308 may be configured to evaluate the value of the gift. In some embodiments, the value of the gift may be evaluated during the generation of the gift. More specifically, the evaluating unit 308 may evaluate the value of the gift according to the input from the viewer. For example, the evaluating unit 308 may determine the value of the gift according to the value inputted by the viewer. In some embodiments, the evaluating unit 308 may extract keywords such as luxury, normal, cheap or the like to determine the value of the gift. In some embodiments, the evaluation of the value may also be realized via machine learning technology such as language models or the like.

In some embodiments, the value of the gift may also be evaluated after the generation of the gift. In some embodiments, the evaluating unit 308 may evaluate the value of the gift according to the interaction between the viewers and livestreamer in the live streaming room. In other words, the value of the customized gift may vary according to the interaction in the live streaming room. For example, the value of the gift may increase according to the increase of comments or popularity in the live streaming room.

In some embodiments, the value of the gift may increase according to the number of times the gift is sent in the live streaming room. For example, the value of the gift may increase proportionally in response to the gift being sent in the live streaming room. In some embodiments, any possible interaction in the live streaming room may contribute to the increase or decrease of the value of the gift. In some embodiments, the functionality of the increase or decrease of the value may be determined flexibly according to the practical need.

The publishing unit 310 may be configured to publish the gift to the livestreamer or the viewers in the live streaming room. More specifically, once the generation and evaluation of the gift is finished, the viewer may publish the information of the gift to the livestreamer. The publishing unit 310 may receive the request on publishing the gift to the livestreamer from the viewer, and then transmit the information of the gift to the livestreamer.

Once the livestreamer receives the information of the gift generated by the viewer, the livestreamer may determine whether to publish the gift in the live streaming room. For example, if the gift is an event gift in the event the livestreamer is participating in, the livestreamer may determine whether to show or make available the gift to the other viewers in the live streaming room.

In some embodiments, the livestreamer may perform an operation on publishing the gift in the live streaming room. For example, a switch or toggle may be displayed for the livestreamer to toggle on or off in order to publish the gift to the viewers in the live streaming room. In some embodiments, the way for the livestreamer to publish the gift may be determined flexibly according to the practical need.

Once the livestreamer toggles on the gift, the publishing unit 310 may receive the request of publishing the gift in the live streaming room from the livestreamer, and the publishing unit 310 may change the status of the gift in the customized gift DB 326 and then publish the gift in the live streaming room. For example, the publishing unit 310 may set status of the customized gift on and then transmit information of the gift to all the viewers in the live streaming room, so that the viewers may send the customized gift to the livestreamer.

In some embodiments, the gift may be generated based on the invitation from the livestreamer or voluntarily by the viewers, livestreamers or the like. In some embodiments, the gift may only be published to the live streaming room by the livestreamer, or the viewer may also publish the gift to the live streaming room without permission from the livestreamer. In some embodiments, the design and functionality of the customized gift may be determined flexibly according to the practical need.

The processing unit 312 may be configured to handle the leaderboard in an event. More specifically, the processing unit 312 may determine whether to contribute the gift to the leaderboard in the event. the processing unit 312 may further calculate the leaderboard according to the contribution from the viewers or the like. In some embodiments, the processing unit 312 may further update the leaderboard according to the calculation of the leaderboard.

In some embodiments, the way to determine whether to contribute the customized gift to a leaderboard may be determined flexibly. In some embodiments, it may be determined according to the input from the creator while generating the customized gift. For example, the viewer may determine whether the gift is an event gift, which event and livestreamer the gift is related to or the like. In some embodiments, it may be determined according to the livestreamer's selection. In some embodiments, it may also be determined according to the rules of the events or the like.

In some embodiments, if the customized gift is an event gift for the event the livestreamer is participating in, the processing unit 312 may calculate a leaderboard in the event once viewers send the customized gift to the livestreamer. In some embodiments, the processing unit 312 may further update the leaderboard according to the calculation. According to the embodiments, the livestreamer and viewers may understand the latest status of the events and it may be easier to support their favorite livestreamer.

In some embodiments, the server 10 may further include gift info unit (not shown) and gift processing unit (not shown). The gift info unit provides information on gifts to the corresponding livestreamer and viewers. The gift info unit transmits, to the livestreamer, the gift information for the terminal in response to a request from the user terminals. The gift info unit obtains, from the gift DB 324, the effect data corresponding to the gift ID included in the gift information signal that has been received by the relay unit 304. The gift info unit transmits the obtained effect data to the other user terminals 20 and 30 as a response to the gift sending request signal.

The gift processing unit updates the user DB 322 so as to update the points of the livestreamer and the viewer depending on the points of the gift identified by the gift ID included in the gift usage signal. Specifically, the gift processing unit refers to the gift DB 324 to specify the points to be granted for the gift ID included in the received gift usage signal. The gift processing unit then updates the user DB 322 to add the determined points to the points of the livestreamer ID included in the gift usage signal. In some embodiments, the gift processing unit may also update the user DB 322 to subtract the determined points from the points of the viewer ID included in the gift usage signal.

FIG. 4 shows an exemplary data structure of the stream DB 320 of FIG. 3. The stream DB 320 holds information regarding a live stream currently taking place. The stream DB 320 stores a stream ID for identifying a live-stream on a live distribution platform provided by the live-streaming system 1, a livestreamer ID for identifying the livestreamer who provides the live-stream, and a viewer ID for identifying a viewer of the live-stream, in association with each other.

FIG. 5 shows an exemplary data structure of the user DB 322 of FIG. 3. The user DB 322 holds information regarding users. The user DB 322 stores a user ID for identifying a user, points for identifying the points the user accumulates, level for identifying the level of the user and status for identifying the status of the user in association with each other. The point is the electronic value circulated within the live-streaming platform. The level may be an indicator of the amount of user activity or engagement on the live streaming platform. The status may be an identity or membership status of the user on the live streaming platform.

FIG. 6 shows an exemplary data structure of the gift DB 324 of FIG. 3. The gift DB 324 maintains information on gifts that can be used by the viewer in the live streaming. The gift DB 324 stores a gift ID for identifying a gift, the amount of points that the viewer spends in order to send the gift to the streamer, the event ID for identifying the event the gift is corresponding to, and the effect data for the gift, in association with each other.

The viewer can give the gift to the streamer by paying the equivalent value points for a desired gift while watching the live streaming. The payment of such equivalent value points can be made by an appropriate electronic means, for example, the viewer can pay the equivalent value points to the administrator. Alternatively, bank transfers or credit card payments can also be used. The relationship between awarded points and equivalent value points can be set arbitrarily by the administrator.

A gift is electronic data with the following characteristics:

It can be purchased in exchange for the points (later described in detail) or can be given for free.

It can be given by a viewer to a streamer. Giving a gift to a streamer is referred to as using the gift or throwing the gift.

Some gifts may be purchased and used at the same time, and some gifts may be purchased or given and then used at any time later by the purchaser or recipient viewer.

When a viewer gives a gift to a streamer, the streamer is awarded the amount of points corresponding to the gift and an effect associated with the gift is exerted. For example, an effect corresponding to the gift will appear on the live streaming screen.

The effect is a visual or auditory or tactile effect (e.g., vibration) or a combination thereof that characterizes a gift. Examples of the visual effect include animation, images, and flashing/blinking. Examples of the auditory effect include sound effects and voice. The effect data is data for realizing such an effect on the user terminal 20, and the user terminal 20 realizes such an effect by processing the effect data. Since the technique for realizing the effect data itself is known, it will not be hereunder described in detail.

FIG. 7 shows an exemplary data structure of the customized gift DB 326 of FIG. 3. The customized gift DB 326 holds information regarding the customized gift. The customized gift DB 326 stores a customized item ID for identifying a customized gift, a point for identifying the point of the customized gift, a value for identifying the value of the customized gift, the event ID for identifying the event the gift is corresponding to, the creator ID for identifying the user who created the customized gift, the invitee ID for identifying the user who sent the invitation to the creator, the status for identifying the publication of the customized gift and the effect for identifying the effect data for the customized gift, in association with each other.

In some embodiments, if the gift type of the customized gift is event gift, the event ID may store the corresponding event information. If not, the event ID may be empty or the like. In some embodiments, the information of gift type may also be stored in the gift DB 324, customized gift DB 326 or the like. In some embodiments, the invitee ID may be empty or the like if the customized gift is created voluntarily by the creators themselves without invitation. In some embodiments, the customized gift may also be stored in the gift DB 324, or a separated DB such as the customized gift DB 326. In some embodiments, the information in the customized gift DB 326 may be determined flexibly.

FIG. 8 shows an exemplary data structure of the event DB 328 of FIG. 3. The event DB 328 stores the information of the event the APP or platform provider is holding. The event DB 328 stores an event ID for identifying an event, the event gift ID for identifying the gift in an event, the starting time and end time for identifying the starting time and end time of the event.

Here, the "event" may be referred to as the event for the streamer to compete with the points they received. The event may be held by the APP or platform provider. The viewers may send virtual items such as gifts to the streamers and each virtual item may be corresponding to a specific amount of points. The streamers may interact with the viewers to collect points. In the event, the streamers may be ranked according to the points they received. The streamers who received relatively high points may obtain the reward. In some embodiments, each event may include specific gifts respectively, so only specific gifts may contribute to the points the streamer received. In some embodiments, the gifts may be common to all the events. In some embodiments, the rule for the event may be designed according to the practical need.

The event may be started from the starting time and ended until the end time. The streamers who are participating in the event may compete with each other for the amount of event gift collected from the viewers during a specific time, which may be the period from the starting time to the end time. The streamer who collects the most amount of event gift may be the winner and receive a specific reward. In some embodiments, the rule of the event and the index for determining the winner may be designed flexibly.

Figure 9:
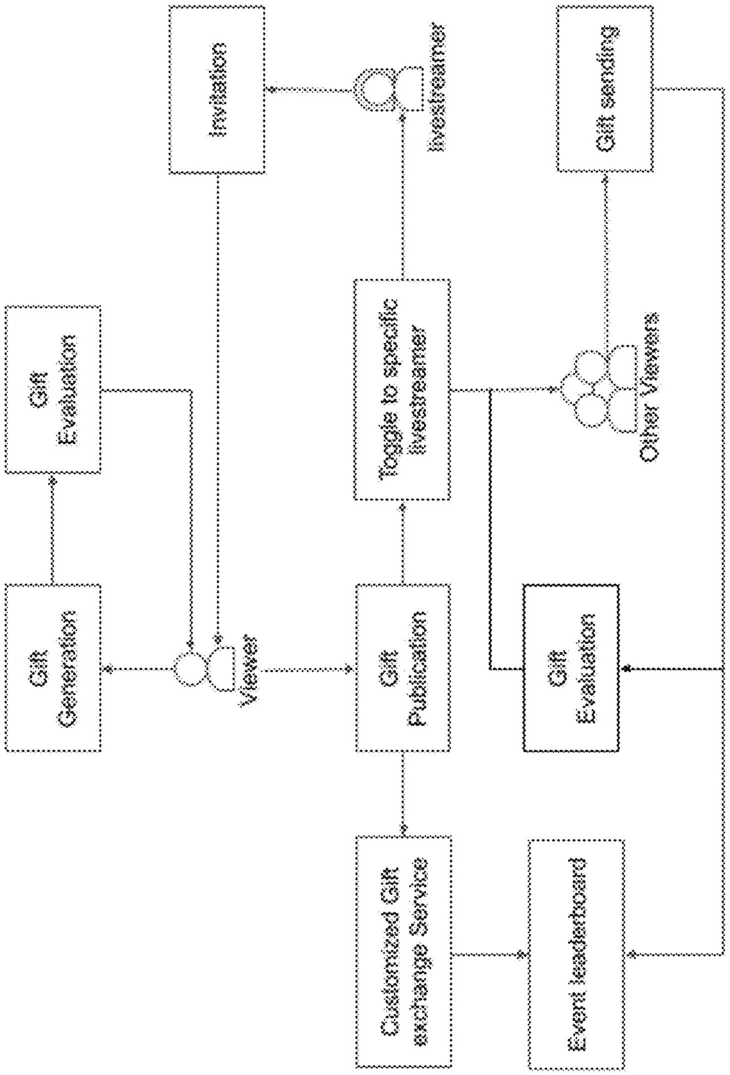
FIG. 9 is exemplary functional configuration of the live streaming system 1 according to some embodiments of subject application.

FIG. 9 is exemplary functional configuration of the live streaming system 1 according to some embodiments of subject application. As shown in FIG. 9, the livestreamer may send an invitation for generating a gift to a viewer. In some embodiments, the livestreamers may generate gifts by themselves or the viewers may generate gifts without the invitation from the livestreamer. In some embodiments, the viewer may generate the gift via text, audio, video, uploading files or the like. For example, the viewer may enter a description, say a sentence or upload information about the gift such as image, animation or the like.

In some embodiments, the input from the viewer or the livestreamer may be transmitted to server 10. Server 10 may generate the gift and then evaluate the value of the gift. For example, the generating unit 306 and the evaluating unit 308 may generate the gift and evaluate the value of the gift according to the input from the viewer.

Once the customized gift is generated and evaluated, the viewer may publish the gift to the livestreamer. In some embodiments, the viewer may amend, change, update or delete the gift during or after the generation of the gift. For example, the viewer may associate the customized gift to specific type such as event gift, associate the customized gift to specific livestreamer, specific live streaming room, specific period or the like. In some embodiments, the viewer may publish the customized gift to the live streaming room directly without publishing to the livestreamer.

In some embodiments, the livestreamer may determine whether to publish the customized gift to the live streaming room once receiving the customized gift from the viewer. For example, an UI interface with a switch or toggle may be displayed on the screen 600 for the livestreamer to determine whether to publish the customized gift or not.

Meanwhile, the customized gift may also be transmitted to a customized gift exchange service in server 10 to determine whether the gift is related to an event in the live streaming platform. The customized gift exchange service may be one service of an event management system in server 10, and the event management system may be in charge of event management such as generating event, determining rules, and calculating leaderboard or the like according to the practical need.

In some embodiments, the customized gift exchange service may determine whether to contribute the customized gift to a leaderboard or not. For example, if the customized gift is an event gift in an event that the livestreamer is participating in, once the viewers send the customized gift to the livestreamer, the value of the customized gift may contribute to a leaderboard in the event. In some embodiments, the rules of the event may be organized flexibly to determine whether the customized gift is contributed to a leaderboard in the event or not.

Once the customized gift is published to the live streaming room, the viewers in the live streaming room may send the customized gift to the livestreamer. For example the viewers may click a gift icon to open a gift list, and the customized gift may be displayed in a tab of the gift list such as “event”, “customized”, “luxury” or the like.

In some embodiments, the value of the customized gift may change according to the interaction in the live streaming room. In some embodiments, the interaction may be any possible interaction in the live streaming room. For example, the value of the customized gift may be determined according to the number of viewers who send the customized gift to the livestreamer. More specifically, the value of the gift may increase or decrease in response to an increase or decrease in the number of viewers who send the gift. In some embodiments, the value may also be determined according to the number of times the gift is sent or the like.

In some embodiments, the gift evaluation procedure during the generation of the gift and during the interaction between livestreamer and viewers may be realized by the same evaluating unit 308 or different evaluating unit 308. In other words, the evaluation of the value of the gift may be realized via the same unit or separated unit. In some embodiments, the interaction and the evaluation of the value of the gift may also be reflected on the leaderboard during the calculation of the leaderboard. For example, the interaction and the evaluation may be transmitted to the leaderboard in the format of raw data, and further be decoded according to the rules of the event and then be reflected on the leaderboard.

Once the gift is sent to the livestreamer, the livestreamer may receive a point corresponding to the value of the gift. If the customized gift is an event gift, the value of the customized gift may also contribute to a leaderboard in the event. For example, if the livestreamer is participating in an event and a customized event gift is sent to the livestreamer, score or rank of the livestreamer may change according to the receiving gift of the livestreamer.

According to the embodiments, the livestreamer may generate or invite viewers to generate a customized gift. The customized gift may help the livestreamer on the interaction with viewers and also in the event or the like. Therefore, the user experience and interaction between the livestreamer and viewers may be improved.

Figure 10:
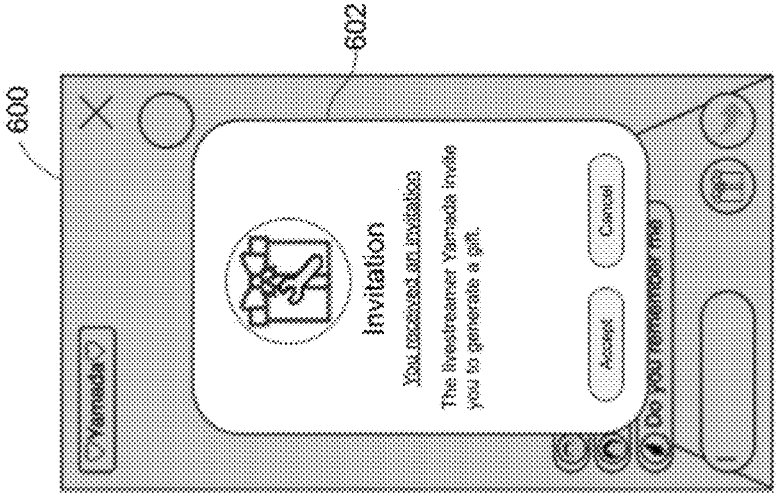
FIG. 10-FIG. 15 are exemplary screen images of a live-streaming room screen 600 shown on the display of the livestreamer user terminal 20 or the viewer user terminal 30.

FIG. 10-FIG. 15 are exemplary screen images of a live-streaming room screen 600 shown on the display of the livestreamer user terminal 20 or the viewer user terminal 30. As shown in FIG. 10, the viewer may receive an invitation 602 on generating a gift from a livestreamer. In some embodiments, the invitation may also be from another viewer, from server 10 or the like. For example, server 10 may automatically send an invitation to the viewer during the event or right before the end of the event to make the event more exciting. In some embodiments, the invitation may also be triggered by the viewers. For example, the viewers may send a specific amount of gift to trigger an invitation on generating customized gifts or the like. In some embodiments, design of the invitation may be determined flexibly.

Figure 11:
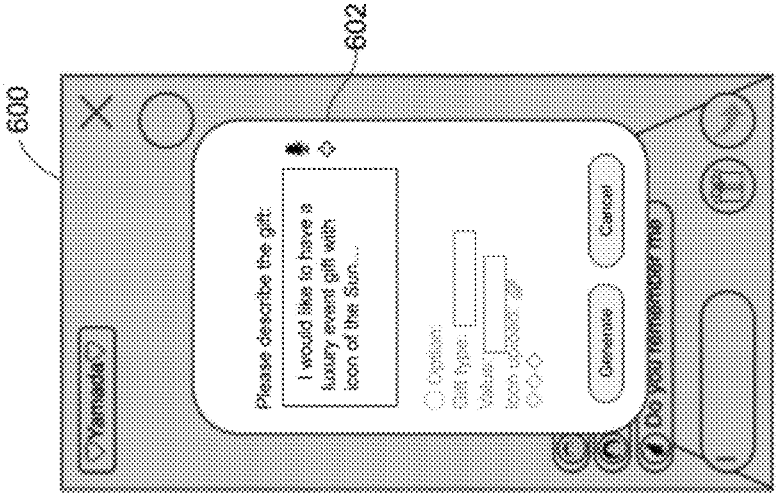

In some embodiments, the viewer may enter a description related to the gift to be generated as shown in FIG. 11. In some embodiments, the viewer may also enter the description by microphone, uploading a file, filling in a form or the like as shown in FIG. 11. In some embodiments, the way to generate a customized gift may be determined flexibly.

Figure 12:
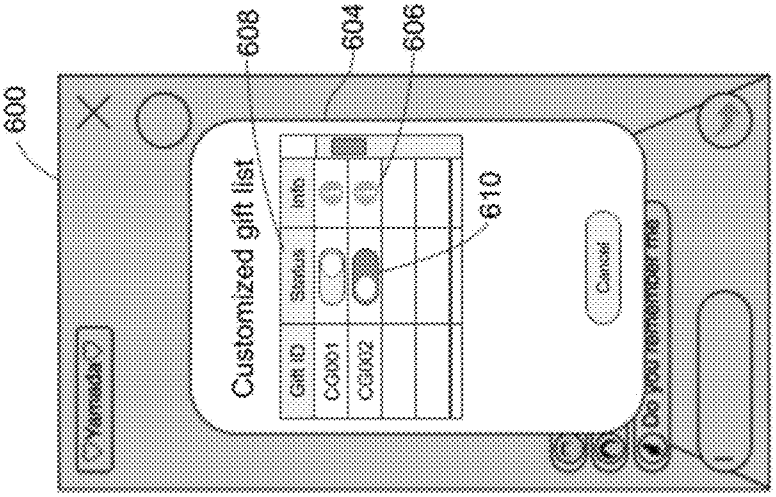

Once the generation and evaluation of the gift is finished, the information of the customized gift may be transmitted to the livestreamer via server 10 or the like. In some embodiments, a list 604 may be provided for the livestreamer to manage the customized gift as shown in FIG. 12. In some embodiments, the list 604 may include the customized gifts received or manufactured by the livestreamer. In some embodiments, each customized gift may include an information icon 606, and information of the customized gift may be displayed once the information icon 606 is being clicked or the like.

In some embodiments, each customized gift may also have a status 608. The status 608 may show the publication of the gift in the live streaming room. For example, a switch 610 may be displayed to indicate the publication of the gift or not as shown in FIG. 12. The livestreamer may click on the switch to determine whether to publish the customized gift in the live streaming room or not.

Figure 13:
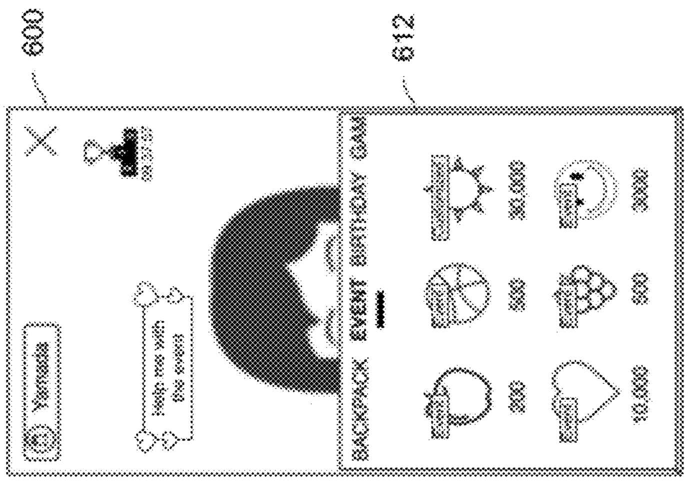

Once the switch is on, the publishing unit 310 may transmit information of the customized gift to the viewers in the live streaming room. As shown in FIG. 13, the customized gift may be shown in the gift list 612. In some embodiments, the customized gift may be displayed in the corresponding tab of the gift. For example, if the customized gift is an event gift, the customized gift may be displayed in the event list tab. In some embodiments, a separated tab of customized gifts may also be provided to display the customized gift in the live streaming room.

Figure 14:
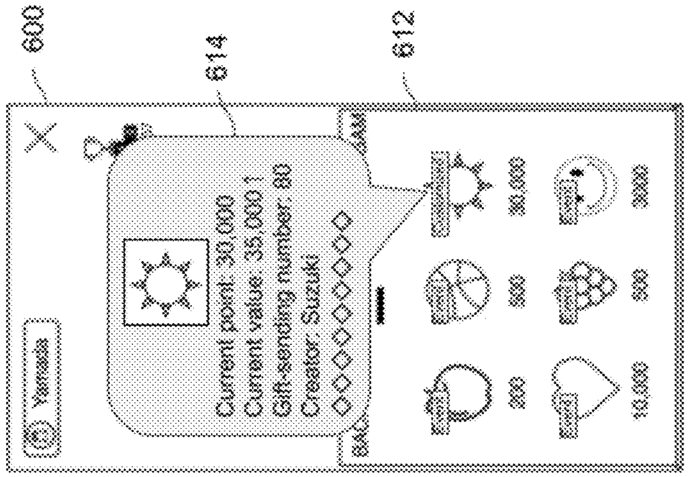

In some embodiments, the value of the customized gift may change according to the interaction in the live streaming room. As shown in FIG. 14, the information of the customized gift may be provided for the viewers to check. For example, a pop-up message 614 may be displayed on the customized gift automatically or in response to an operation from the viewers. In some embodiments, the information may include, for example, the current point of the gift, current value of the gift, creator of the customized gift, number of times the gift being sent or the like.

In some embodiments, the current point may be the amount of points that the viewers spend in order to send the customized gift to the livestreamer, and the current value may be the amount of points contributed to the livestreamer or to a leaderboard in the event. For example, the viewers may spend 30,000 points to send a sun to the livestreamer, and the livestreamer may receive 35,000 points or the score of the livestreamer in the leaderboard may increase by 35,000 or the like.

Figure 15:
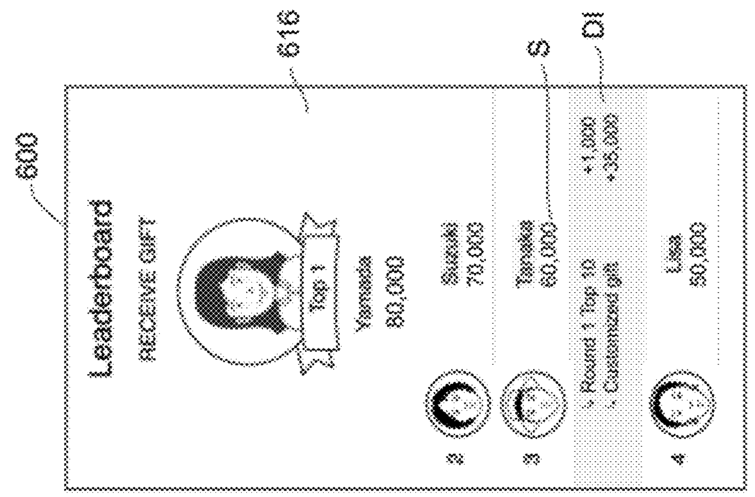

FIG. 15 shows an exemplary leaderboard page 616. In some embodiments, the leaderboard page 616 may display the ranking of the users and their corresponding score S. In some embodiments, detailed information DI of the score S may also be displayed below each user to indicate the information of the score in detail. For example, the detailed information DI may include score bonuses, score combination, or other relevant information. In some embodiments, if the customized gift is an event gift, the value of the customized gift may contribute to the score in the leaderboard. As shown in FIG. 15, the score of the livestreamer Tanaka includes the value 35,000 of the customized gift.

In some embodiments, the way to determine whether the customized gift is contributed to a leaderboard in an event may be determined flexibly. For example, the staff may set the customized gift as an event gift while setting the event. In some embodiments, the customized gift may be associated with a certain event, certain livestreamer, certain live streaming room, certain time period, certain geometric location or the like.

In some embodiments, the gift may be classified into a plurality of type such as event gift, voting gift, filtering gift or the like. In some embodiments, the customized gift may also be a type of gift. The type of customized gift may include the gift which is generated by the user. In some embodiments, the customized gift may be located in a separated tab in the gift list, or be located in the corresponding tab according to the detailed information of the customized gift.

In some embodiments, interaction in the live streaming may increase or decrease the value of the customized gift. For example, the increase or decrease of the participants or popularity in the live streaming room may cause an increase or decrease of the value of the customized gift. In some embodiments, if the creator of the customized gift is in the live streaming room, the value of the customized gift may increase or the like. In some embodiments, if the creator sends the customized gift, an extra bonus value may further contribute to the leaderboard or the like. In some embodiments, the detailed design of the customized gift may be determined flexibly.

In some embodiments, the livestreamer may determine the value of the customized gift. In some embodiments, the livestreamer may determine the value according to the viewers' interaction. For example, the livestreamer may initiate a vote for the viewers to determine whether to increase or decrease the value of the customized gift.

In some embodiments, special items may also be provided from server 10 to determine the value of the customized gift. For example, items for increasing or decreasing the value of the customized gift may be provided. In some embodiments, the items for increasing or decreasing the value of the gift may be a decoration. For example, an item of diamond may be added to the customized gift of a ring to increase the value of the customized gift. An item of ink may be added to the customized gift of a dress to decrease the value of the customized gift. In some embodiments, an item for making the customized gift invisible may also be provided so that the viewer may prevent other viewers from sending the customized gift to the opposite livestreamer. In some embodiments, an item for preventing from increasing or decreasing the value of the customized gift may also be provided.

In some embodiments, the creator or livestreamer may locate the customized gift in a specific location. For example, the livestreamer may place the customized gift in an eye-catching location. The location may be the middle of the live streaming room, the first place once the gift listed is displayed, a promotion message in the APP or the like. In some embodiments, the detailed design of the customized gift may be determined flexibly.

Figure 16:
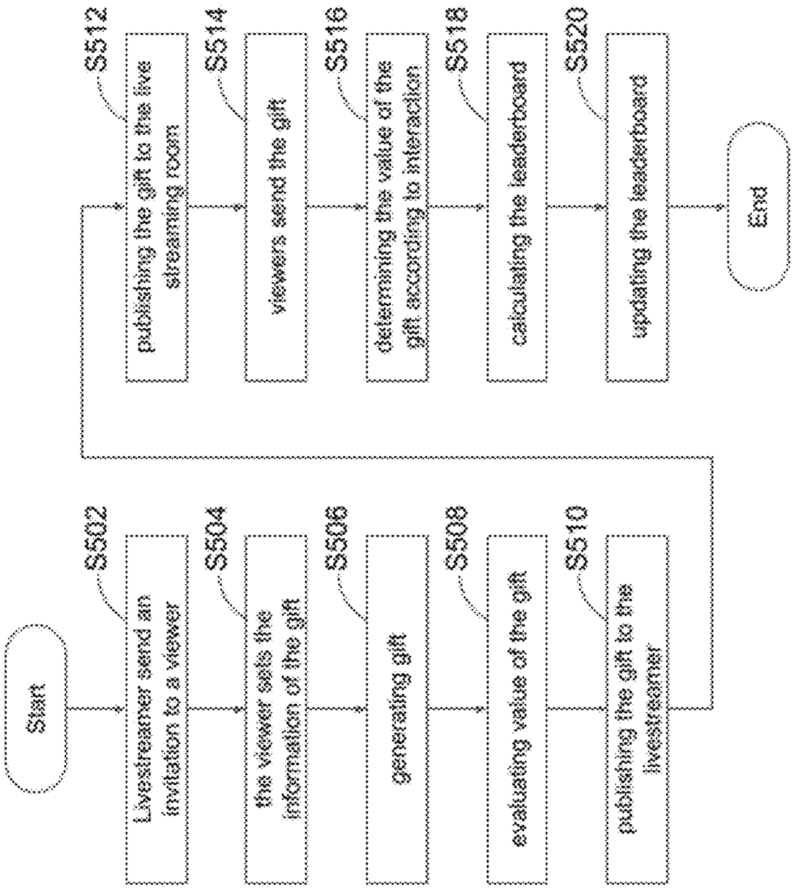
FIG. 16 is a flowchart showing steps of an application activation process on the user terminals 20 and 30.

The operation of the live streaming system 1 with the above configuration will be now described. FIG. 16 is a flowchart showing steps of an application activation process on the user terminals 20 and 30. Once a user enters a live streaming room, the user may perform an operation by the user terminal to interact with a livestreamer. In some embodiments, the operation may include commenting, sending gifts, following, unfollowing, voting, gaming or the like.

In some embodiments, the livestreamer may be participating in an event in the live streaming platform and would like to have support from the viewers in the live streaming room. As shown in FIG. 16, the livestreamer may send an invitation on generating a gift to a viewer (S502). In some embodiments, the viewer may be in the live streaming room or not. Once the viewer receives the invitation, the viewer may generate the gift by, for example, setting the information of the gift or the like (S504).

After the setting of the customized gift is done, the customized gift may be generated via server 10 or the like (S506). Furthermore, the value of the customized gift may also be evaluated via server 10 or the like (S508). In some embodiments, the generation and evaluation of the customized gift may also be realized in the terminal side or the like. Once the generation and evaluation are completed, the viewer may further publish the gift to the livestreamer (S510).

In some embodiments, the livestreamer may confirm and further publish the gift to the live streaming room or the like (S512). Once the customized gift is published to the live streaming room, viewers in the live streaming room may send the customized gift to the livestreamer to support the livestreamer (S514). In some embodiments, if the livestreamer is participating in an event, the customized gift may be an event gift. The event gift may be contributed to a leaderboard in the event once the livestreamer receives it.

In some embodiments, the value of the customized may be determined according to the interaction in the live streaming room (S516). The interaction may be any possible interaction in the live streaming room, and may be determined flexibly. In some embodiments, the point of the gift may be the amount of points the viewer consumes, and the value of the gift may be the amount of points the livestreamer receives. In some embodiments, the point or the value of the gift may increase or decrease according to the interaction. In some embodiments, the difference between the point and the value of the gift may increase or decrease according to the interaction.

In some embodiments, a leaderboard in the event may be calculated according to the gift received by the livestreamer (S518). Once the calculation of the leaderboard is finished, the result may further be updated on the leaderboard (S520). Therefore, the viewers and livestreamer may understand the situation of the event and help themselves or their favorite livestreamer to win the event or the like.

According to the present disclosure, the livestreamer may generate or invite viewers to generate a customized gift. The customized gift may help the livestreamer on the interaction with viewers and also in the event or the like. Therefore, the user experience and interaction between the livestreamer and viewers may be improved.

Figure 17:
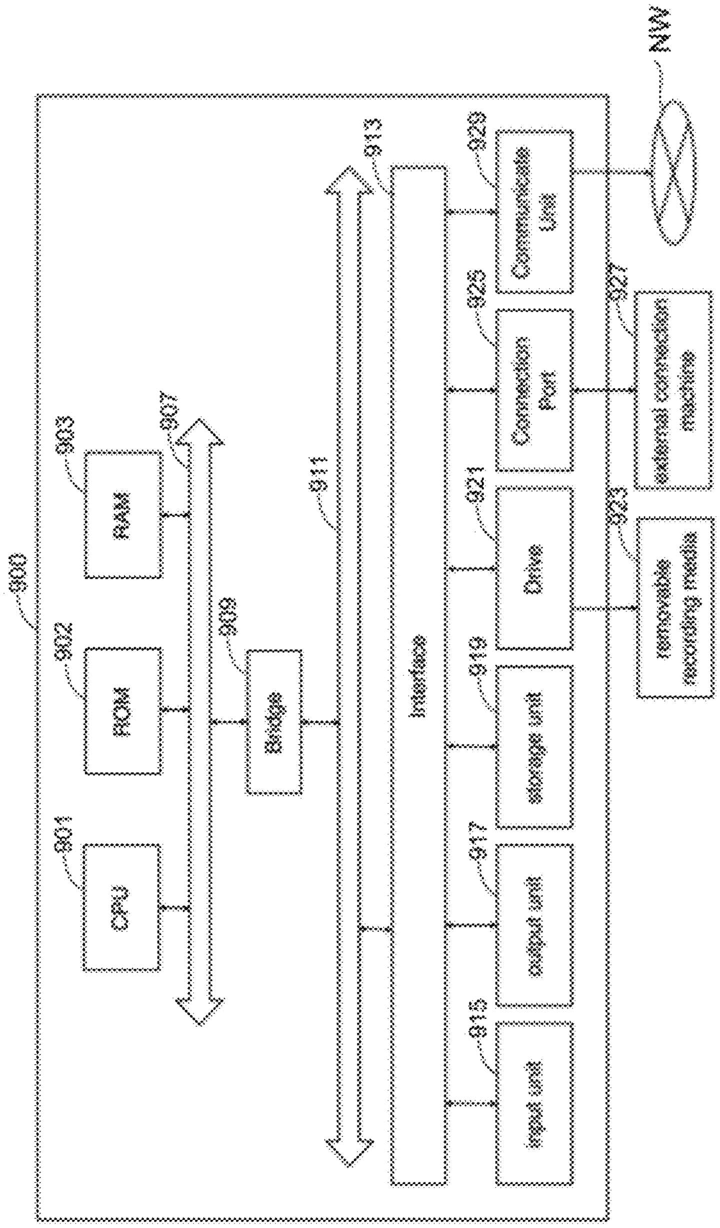
FIG. 17 is an exemplary hardware configuration of the information processing device according to some embodiments of subject application.

FIG. 17 is a schematic block diagram of computer hardware for carrying out a system configuration and processing according to some embodiments of subject application. The information processing device 900 in FIG. 17 is, for example, is configured to realize the server 10 and the user terminal 20, 30 respectively according to some embodiments of subject application.

The information processing device 900 includes a CPU 901, read only memory (ROM) 902, and random-access memory (RAM) 903. In addition, the information processing device 900 may include a host bus 907, a bridge 909, an external bus 911, an interface 913, an input unit 915, an output unit 917, a storage unit 919, a drive 921, a connection port 925, and a communication unit 929. The information processing device 900 may include imaging devices (not shown) such as cameras or the like. The CPU 901 is an example of hardware configuration to realize various functions performed by the components described herein. The functions described herein may be realized by circuitry programmed to realize such functions described herein. The circuitry programmed to realize such functions described herein includes a central processing unit (CPU), a digital signal processor (DSP), a general-use processor, a dedicated processor, an integrated circuit, application specific integrated circuits (ASICs) and/or combinations thereof. Various units described herein as being configured to realize specific functions, including but not limited to the streaming unit 100, the viewing unit 200, the video control unit 102, the audio control unit 104, the distribution unit 106, the UI control unit 108, the UI control unit 202, the rendering unit 204, the input transmit unit 206, the streaming info unit 302, the relay unit 304, the generating unit 306, the evaluating unit 308, the publishing unit 310, the processing unit 312, the stream DB 320, the user DB 322, the gift DB 324, the customized gift DB 326, the event DB 328 and so on, may be embodied as circuitry programmed to realize such functions.

The CPU 901 functions as an arithmetic processing device and a control device, and controls the overall operation or a part of the operation of the information processing device 900 according to various programs recorded in the ROM 902, the RAM 903, the storage unit 919, or a removable recording medium 923. For example, the CPU 901 controls overall operations of respective function units included in the server 10 and the user terminals 20 and 30 of the above-described embodiment. The ROM 902 stores programs, operation parameters, and the like used by the CPU 901. The RAM 903 transiently stores programs used when the CPU 901 is executed, and parameters that change as appropriate when executing such programs. The CPU 901, the ROM 902, and the RAM 903 are connected with each other via the host bus 907 configured from an internal bus such as a CPU bus or the like. The host bus 907 is connected to the external bus 911 such as a Peripheral Component Interconnect/Interface (PCI) bus via the bridge 909.

The input unit 915 is a device operated by a user such as a mouse, a keyboard, a touchscreen, a button, a switch, and a lever. The input unit 915 may be a device that converts physical quantity to electrical signal such as audio sensor (such as microphone or the like), acceleration sensor, tilt sensor, infrared radiation sensor, depth sensor, temperature sensor, humidity sensor or the like. The input unit 915 may be a remote-control device that uses, for example, infrared radiation and another type of radio waves. Alternatively, the input unit 915 may be an external connection device 927 such as a mobile phone that corresponds to an operation of the information processing device 900. The input unit 915 includes an input control circuit that generates input signals on the basis of information which is input by a user to output the generated input signals to the CPU 901. The user inputs various types of data and indicates a processing operation to the information processing device 900 by operating the input unit 915.

The output unit 917 includes a device that can visually or audibly report acquired information to a user. The output unit 917 may be, for example, a display device such as an LCD, a PDP, and an OLED, an audio output device such as a speaker and a headphone, and a printer. The output unit 917 outputs a result obtained through a process performed by the information processing device 900, in the form of text or video such as an image, or sounds such as audio sounds.

The storage unit 919 is a device for data storage that is an example of a storage unit of the information processing device 900. The storage unit 919 includes, for example, a magnetic storage device such as a hard disk drive (HDD), a semiconductor storage device, an optical storage device, or a magneto-optical storage device. The storage unit 919 stores therein the programs and various data executed by the CPU 901, and various data acquired from an outside.

The drive 921 is a reader/writer for the removable recording medium 923 such as a magnetic disk, an optical disc, a magneto-optical disk, and a semiconductor memory, and built in or externally attached to the information processing device 900. The drive 921 reads out information recorded on the mounted removable recording medium 923, and outputs the information to the RAM 903. The drive 921 writes the record into the mounted removable recording medium 923.

The connection port 925 is a port used to directly connect devices to the information processing device 900. The connection port 925 may be a Universal Serial Bus (USB) port, an IEEE1394 port, or a Small Computer System Interface (SCSI) port, for example. The connection port 925 may also be an RS-232C port, an optical audio terminal, a High-Definition Multimedia Interface (HDMI (registered trademark)) port, and so on. The connection of the external connection device 927 to the connection port 925 makes it possible to exchange various kinds of data between the information processing device 900 and the external connection device 927.

The communication unit 929 is a communication interface including, for example, a communication device for connection to a communication network NW. The communication unit 929 may be, for example, a wired or wireless local area network (LAN), Bluetooth (registered trademark), or a communication card for a wireless USB (WUSB).

The communication unit 929 may also be, for example, a router for optical communication, a router for asymmetric digital subscriber line (ADSL), or a modem for various types of communication. For example, the communication unit 929 transmits and receives signals on the Internet or transmits signals to and receives signals from another communication device by using a predetermined protocol such as TCP/IP. The communication network NW to which the communication unit 929 connects is a network established through wired or wireless connection. The communication network NW is, for example, the Internet, a home LAN, infrared communication, radio wave communication, or satellite communication.

The imaging device (not shown) is a device that images real space using an imaging device such as a charge coupled device (CCD) or a complementary metal oxide semiconductor (CMOS), for example, and various members such as a lens for controlling image formation of a subject image on the imaging device and generates a captured image. The imaging device may capture a still picture or may capture a movie.

The present disclosure of the live streaming system 1 has been described with reference to embodiments. The above-described embodiments have been described merely for illustrative purposes. Rather, it can be readily conceived by those skilled in the art that various modifications may be made in making various combinations of the above-described components or processes of the embodiments, which are also encompassed in the technical scope of the present disclosure.

The procedures described herein, particularly flowchart or those described with a flowchart, are susceptible of omission of part of the steps constituting the procedure, adding steps not explicitly included in the steps constituting the procedure, and/or reordering the steps. The procedure subjected to such omission, addition, or reordering is also included in the scope of the present disclosure unless diverged from the purport of the present disclosure.

In some embodiments, at least a part of the functions performed by the server 10 may be performed by other than the server 10, for example, being performed by the user terminal 20 or 30. In some embodiments, at least a part of the functions performed by the user terminal 20 or 30 may be performed by other than the user terminal 20 or 30, for example, being performed by the server 10. In some embodiments, the rendering of the frame image may be performed by the user terminal of the viewer, the server, the user terminal of the livestreamer or the like.

Furthermore, the system and method described in the above embodiments may be provided with a computer-readable non-transitory storage device such as a solid-state memory device, an optical disk storage device, or a magnetic disk storage device, or a computer program product or the like. Alternatively, the programs may be downloaded from a server via the Internet.

Although technical content and features of the present disclosure are described above, a person having common knowledge in the technical field of the present disclosure may still make many variations and modifications without disobeying the teaching and disclosure of the present disclosure. Therefore, the scope of the present disclosure is not limited to the embodiments that are already disclosed but includes another variation and modification that do not disobey the present disclosure, and is the scope covered by the following patent application scope.

What is claimed is:

1. A server comprising a circuitry, wherein the circuitry is configured to perform:
- receiving a first request on generating a gift item from a first user terminal of a first user;
- generating the gift item according to the first request; and
- evaluating value of the gift item according to an interaction between the first user and a second user in a live streaming room after the generation of the gift item; wherein
- each gift item corresponds to a specific amount of points contributed to the second user in response to a viewer sending the gift item, and the specific amount of points varies according to the interaction.

2. The server according to claim 1, further comprising:
- receiving an invitation on generating the gift item from a second user terminal of the second user; and
- transmitting the invitation to the first user terminal of the first user.

3. The server according to claim 1, further comprising:
- receiving information of the generated gift item from the first user terminal of the first user; and
- transmitting the information of the generated gift item to a second user terminal of the second user.

4. The server according to claim 3, further comprising:
- receiving a second request on publishing the generated gift item in the live streaming room from the second user terminal of the second user; and
- transmitting the information of the generated gift item to viewers in the live streaming room.

5. The server according to claim 1, further comprising:
- receiving a second request on publishing the generated gift item in the live streaming room from the first user terminal of the first user; and
- transmitting the information of the generated gift item to viewers in the live streaming room.

6. The server according to claim 1, further comprising:
- determining whether the gift item is related to an event;
- calculating a leaderboard in the event in response to the gift item being related to the event; and
- updating the leaderboard.

7. The server according to claim 1, wherein:
- the gift item is an event gift item in an event a livestreamer is participating in; and
- the event gift item contributes to a leaderboard in the event when the livestreamer receives from viewers in the live streaming room.

8. A method, comprising:

receiving a first request on generating a gift item from a first user terminal of a first user;

generating the gift item according to the first request; and evaluating value of the gift item according to an interaction between the first user and a second user in a live streaming room after the generation of the gift item;

wherein each gift item corresponds to a specific amount of points contributed to the second user in response to a viewer sending the gift item, and the specific amount of points varies according to the interaction.

9. A non-transitory computer-readable medium including program instructions, that when executed by one or more processors, cause the one or more processors to execute:

receiving a first request on generating a gift item from a first user terminal of a first user;

generating the gift item according to the first request; and evaluating value of the gift item according to an interaction between the first user and a second user in a live streaming room after the generation of the gift item; wherein each gift item corresponds to a specific amount of points contributed to the second user in response to a viewer sending the gift item, and the specific amount of points varies according to the interaction.

* * * * *